(12) United States Patent
Hesslewood et al.

(10) Patent No.: US 10,337,542 B2
(45) Date of Patent: Jul. 2, 2019

(54) CURTAIN RETENTION BRACKET

(71) Applicant: The Boeing Company, Chicago, IL (US)

(72) Inventors: Sean R. Hesslewood, Everett, WA (US); Heidi L. Larson, Everett, WA (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 15/445,551

(22) Filed: Feb. 28, 2017

(65) Prior Publication Data

US 2018/0245610 A1 Aug. 30, 2018

(51) Int. Cl.
| | |
|---|---|
| *B60J 1/20* | (2006.01) |
| *B64C 1/14* | (2006.01) |
| *F16B 2/22* | (2006.01) |
| *B64D 11/06* | (2006.01) |
| *E06B 9/262* | (2006.01) |
| *E06B 9/266* | (2006.01) |
| *F16B 45/02* | (2006.01) |

(52) U.S. Cl.
CPC ............... *F16B 2/22* (2013.01); *B60J 1/2091* (2013.01); *B64C 1/14* (2013.01); *E06B 9/262* (2013.01); *E06B 9/266* (2013.01); *B64D 11/0606* (2014.12); *E06B 2009/2625* (2013.01); *F16B 45/02* (2013.01)

(58) Field of Classification Search
CPC .. E06B 9/262; E06B 9/266; E06B 2009/2625; E06B 9/323; E06B 9/24; B60J 1/2091; A47H 19/00; A47H 2201/00; F16B 2/22; F16B 2/243; F16B 45/02; B64C 1/14; B64C 11/0606

See application file for complete search history.

(56) References Cited

U.S. PATENT DOCUMENTS

| | | | | |
|---|---|---|---|---|
| 3,913,204 A | * | 10/1975 | Finkbeiner | A47H 1/04 29/241 |
| 4,591,285 A | * | 5/1986 | Nelson | E05B 79/12 403/11 |
| 6,422,286 B1 | * | 7/2002 | Osterberg | G09F 11/025 160/23.1 |
| 8,991,468 B2 | * | 3/2015 | Bolton, III | E06B 9/24 160/168.1 R |
| 2005/0022942 A1 | * | 2/2005 | Heitel | B60P 3/343 160/22 |
| 2008/0073037 A1 | * | 3/2008 | Cheng | E06B 9/266 160/84.05 |

(Continued)

*Primary Examiner* — Brian D Mattei
(74) *Attorney, Agent, or Firm* — Ostrager Chong Flaherty & Broitman P.C.

(57) ABSTRACT

Apparatus and methods for retaining a foldable curtain in a stowed position. A curtain retention bracket comprises a U-shaped chambered body having high torsional stiffness and a clasp comprising a flexible strap. The clasp has one end configured to be pivotably coupled to one arm of the U-shaped chambered body and another end configured to be latchable onto the other arm of the U-shaped chambered body. The clasp can be easily opened and closed manually using one hand. The geometry of the clasp is such that forces exerted on it by the stowed curtain cause it to pull tighter closed. The U-shaped chambered body may be produced using an additive manufacturing process.

16 Claims, 6 Drawing Sheets

(56) References Cited

U.S. PATENT DOCUMENTS

| | | | | |
|---|---|---|---|---|
| 2011/0253320 A1* | 10/2011 | Baugh | ............ | E06B 9/262 |
| | | | | 160/127 |
| 2012/0037320 A1* | 2/2012 | Bolton | ............ | E06B 9/262 |
| | | | | 160/84.04 |
| 2015/0173548 A1* | 6/2015 | Lin | ............ | A47H 1/144 |
| | | | | 248/251 |
| 2017/0254472 A1* | 9/2017 | Forsberg | ............ | B25H 3/00 |

* cited by examiner

CURTAIN RETENTION BRACKET

BACKGROUND

This disclosure generally relates to devices designed to retain a foldable curtain in a stowed position. In particular, this disclosure relates to curtain retainers for use onboard an aircraft.

It is common practice to provide curtains within an airplane passenger cabin interior for various purposes, such as providing privacy to passengers or crew, dividing sections of the interior, and muffling noise. Typically such curtains are foldable and are stowed in a folded state. To deploy such a curtain, it may be released from its stowed position and then unfolded. One means for retaining a foldable curtain in a stowed position is a textile strap which can be snapped to a monument wall. This often leads to untidy stowage and is much more difficult and time-consuming to attach and deploy.

The provision of an improved bracket that enables quick, easy and tidy stowage and retention of a curtain would be desirable.

SUMMARY

The subject matter disclosed in detail below is directed to apparatus and methods for retaining a foldable curtain in a stowed position. More specifically, a curtain retention bracket is disclosed below which comprises a U-shaped chambered body having high torsional stiffness and a clasp comprising a flexible strap. The clasp has one end configured to be pivotably coupled to one arm of the U-shaped chambered body and another end configured to be latchable onto the other arm of the U-shaped chambered body. The clasp can be easily opened and closed manually using one hand. The geometry of the clasp is such that forces exerted on it by the stowed curtain cause it to pull tighter closed. The U-shaped chambered body may be produced using an additive manufacturing process. Application of additive manufacturing also facilitates customization such as an embossed logo or graphic to be applied to the bracket.

One aspect of the subject matter disclosed in detail below is a curtain retention bracket comprising: a chambered body having torsional stiffness and comprising a base and first and second arms integrally formed with the base, the first arm having a first end and the second arm having a second end; and a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state.

In accordance with one embodiment of the bracket described in the preceding paragraph, the first end of the first arm of the chambered body has first and second openings, the first end of the clasp comprises a hinge pin portion having a first end seated in the first opening and a second end seated in the second opening, the second end of the second arm of the chambered body comprises a catch feature, the second end of the clasp comprises a latch feature that is latched on the catch feature in a latched state, and the strap in the unstressed state has a first curvature. The clasp and the chambered body are configured such that: (1) in the unlatched state, the latch feature can be latched on the catch feature when the strap has a second curvature less than the first curvature; and (2) in the latched state, the catch feature will exert a first force on the latch feature tending to block displacement of the latch feature when a second force is exerted on the strap in an outward direction away from the base of the chambered body. Furthermore, in the unstressed state an axis of the hinge pin portion and a point where the strap connects to the latch feature are separated by a first distance; in the latched state the axis of the hinge pin portion and the point where the strap connects to the latch feature is separated by a second distance which is either equal to or greater than the first distance; and the clasp is pivotable from the latched state to the unlatched state when the axis of the hinge pin portion and the point where the strap connects to the latch feature are separated by a third distance greater than the second distance by an amount sufficient to enable the latch feature to override the catch feature.

Another aspect of the subject matter disclosed in detail below is an assembly comprising a curtain that is foldable, a wall, and a curtain retention bracket mounted to the wall and configured to retain the curtain in a folded state when the curtain retention bracket is in a closed state, wherein the curtain retention bracket comprises: a stiff chambered body comprising a base and first and second arms integrally formed with the base, the first arm having a first end and the second arm having a second end; and a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state. The first arm is fastened parallel to the wall. The curtain in the folded state is disposed between the first and second arms and between the base and the clasp.

In accordance with some embodiments, the clasp and the chambered body are configured such that: (1) in the unlatched state, a latch feature can be latched on a catch feature when the strap has a second curvature less than the first curvature; and (2) in the latched state, the catch feature will exert a first force on the latch feature tending to block displacement of the latch feature when a second force is exerted on the strap in an outward direction away from the base of the chambered body.

A further aspect is a method for stowing a curtain adjacent a wall, comprising: (a) pivotably coupling one end of a clasp comprising a strap to a first end of a first arm of a chambered body that has torsional stiffness, wherein the strap is flexible and has a bow shape in an unstressed state; (b) fastening the first arm of the chambered body in a horizontal position on the wall; (c) folding at least a portion of the curtain; (d) moving the clasp to an open position; (e) placing at least the folded portion of the curtain between the first arm and a second arm of the chambered body while the clasp is in the open position; (f) flexing the strap to reduce a curvature of the strap; (g) pivoting the clasp until a first projection on another end of the clasp passes over a second projection on an end of the second arm of the chambered body; and (h) releasing the clasp to allow the first projection to latch behind the second projection. In accordance with one embodiment, step (f) is performed by an operator using one hand by pushing the strap with a thumb of his/her hand and pulling the other end of the clasp with a finger of the hand in a manner that reduces the curvature of the strap; and step (g) is performed by the operator moving his/her hand toward the second projection while concurrently pushing the strap and pulling the other end of the clasp. The foregoing method may further comprise producing the clasp and the chambered body using additive manufacturing processes.

Other aspects of apparatus and methods for retaining a foldable curtain are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments are described below as they might be employed in a wall-mounted curtain retention system onboard an aircraft. However, it should be appreciated that the apparatus and methods described below have wider application and may be used to retain curtains in stowed positions in other types of vehicles or in buildings. In the interest of clarity, not all features of an actual implementation are described in this specification. A technician skilled in the art will appreciate that in the development of any such actual embodiment, numerous implementation-specific decisions must be made to achieve the developer's specific goals, which may vary from one implementation to another.

One embodiment of an improved bracket that enables quick, easy and tidy stowage and retention of a curtain will now be described in detail with reference to FIGS. 1-8 for the purpose of illustration. Some alternative embodiments may employ all or less than all of the features to be described below.

Figure 1:
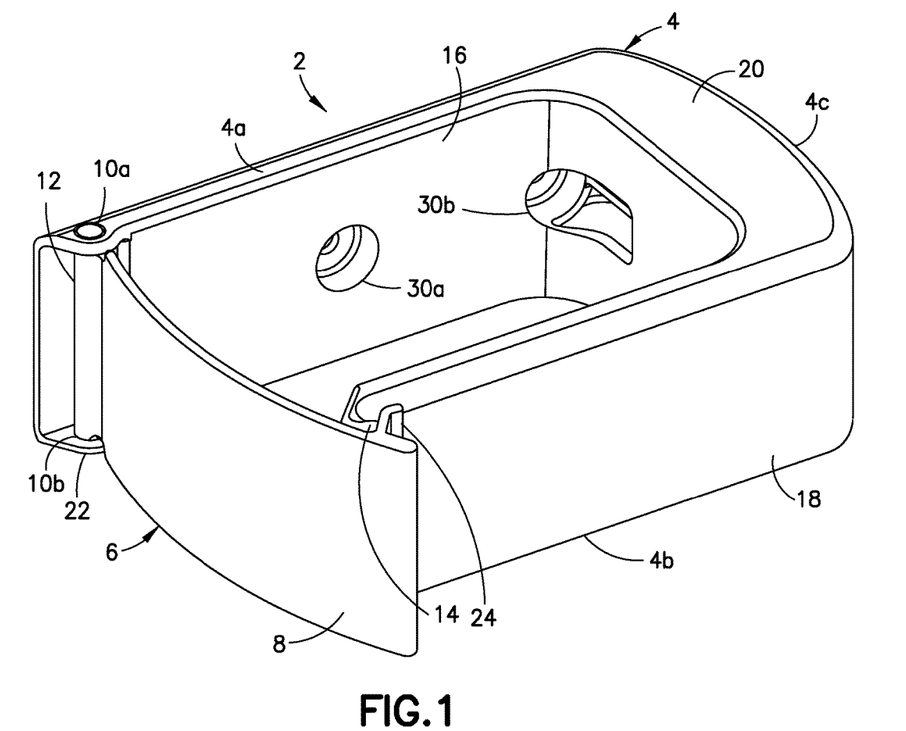
FIG. 1 is a diagram representing an isometric view of a curtain retention bracket in accordance with one embodiment.

FIG. 1 shows an isometric view of a curtain retention bracket 2 in accordance with one embodiment. The curtain retention bracket 2 comprises a U-shaped chambered body 4 (hereinafter "chambered body 4") having torsional stiffness and a clasp 6 comprising a strap 8 that is flexible. The chambered body 4 comprises two arms 4a and 4b connected by and integrally formed with a base 4c. The clasp 6 has one end (hereinafter "first end") configured to be pivotably coupled to the end of arm 4a of the chambered body 4 and another end (hereinafter "second end") configured to be releasably engageable (e.g., latchable) onto the end of arm 4b of the chambered body 4. The strap 8 connects the first end of the clasp 6 to the second end of the clasp. The strap 8 has a bow shape in an unstressed state, which bow shape is visible in FIG. 1.

The chambered body 4 comprises an inner wall 16 and an outer wall 18, which have respective U-shaped profiles. The inner and outer walls 16 and 18 are connected externally by and integrally formed with an upper wall 20 and a lower wall 22. The upper and lower walls 20 and 22 have respective U-shaped areas. The upper and lower walls 20 and 22 may be parallel to each other. The corners where the inner and outer walls 16 and 18 meet and are integrally formed with the upper and lower walls 20 and 22 may be radiused.

Still referring to FIG. 1, the end of arm 4a of the chambered body 4 has a first opening 10a in the upper wall 20 and a second opening 10b in the lower wall 22. The first and second openings 10a and 10b are coaxial and have the same radius. The first end of the clasp 6 comprises a hinge pin portion 12 having a first end seated in the first opening 10a and a second end seated in the second opening 10b. The hinge pin portion 12 is integrally formed with one end of the strap 8 and pivotably couples the strap 8 to the chambered body 4. Thus the strap 8 can be swung about the axis of rotation of the hinge pin portion 12.

The end of arm 4b of the chambered body 4 comprises a catch feature 14, while the other end of the clasp 6 comprises a latch feature 24 that is latched on the catch feature 14 in the latched state depicted in FIG. 1. The latch feature 24 is integrally formed with the other end of the strap 8 and releasably engageable with the catch feature 14. The catch feature 14 is integrally formed with the end of arm 4b of the chambered body 4. In the implementation depicted in FIG. 1, the latch feature 24 and catch feature 14 are respective projections (respectively referred to as "a first projection" and "a second projection" below and in the claims).

The strap in its unstressed state has a bow shape with a first curvature. For example, the bow shape of the strap 8 may be a circular arc in some implementations. The clasp 6 and the chambered body 4 are configured such that the latch feature 24 can be latched on the catch feature 14 when the strap 8 has a second curvature less than the first curvature to hold the clasp closed with the strap in tension. The bow-shaped strap 8 can be flexed in a direction that reduces bowing and then rotated to enable the operator to latch the clasp 6 to the chambered body 4, thereby closing the curtain retention bracket 2. The same flexing and rotating operations can be performed to unlatch the clasp 6 from the chambered body 4, thereby opening the curtain retention bracket 2, except that the rotation will be in the opposite direction.

Depending on the particular implementation, in the latched state the strap 8 will be in either the unstressed state with the first curvature or a stressed state with a second curvature less than the first curvature (i.e., the bowed strap is less bowed). In the unstressed state of strap 8, an axis of the hinge pin portion 12 and a point where the strap 8 connects to the latch feature 24 are separated by a first distance. Accordingly, in the latched state the axis of the hinge pin portion 12 and the point where the strap 8 connects to the latch feature 24 is separated by a second distance which is either equal to or greater than the first distance. The clasp 6 is not pivotable from the latched state to the unlatched state when the axis of the hinge pin portion 12 and the point where the strap 8 connects to the latch feature 24 are separated by the second distance. The clasp 6 is pivotable from the latched state to the unlatched state when the axis of the hinge pin portion 12 and the point where the strap 8 connects to the latch feature 24 are separated by a third distance greater than the second distance by an amount sufficient to enable the latch feature 24 to override the catch feature 14.

Figure 2:
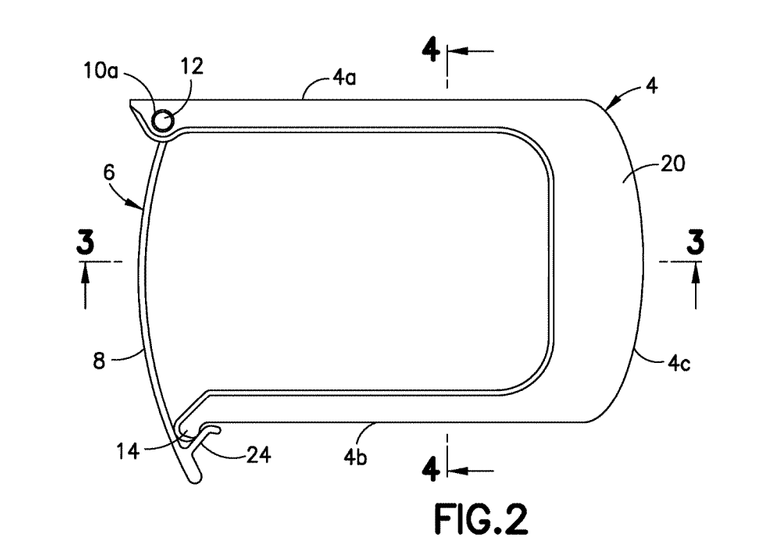
FIG. 2 is a diagram representing a top view of the curtain retention bracket depicted in FIG. 1.
Figure 3:
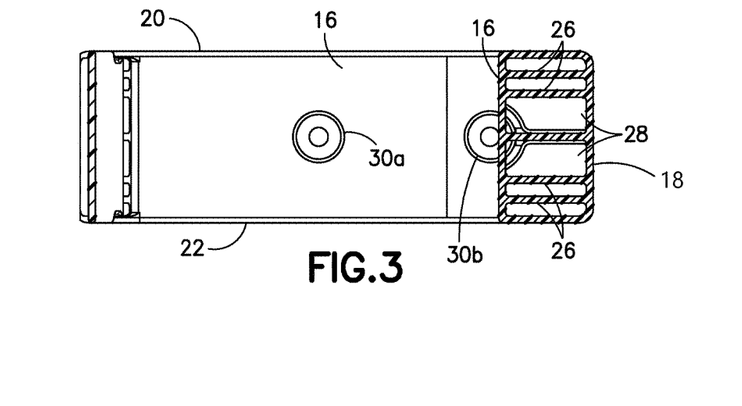
FIG. 3 is a diagram representing a sectional view of the curtain retention bracket depicted in FIG. 1, the section being taken along line 3-3 seen in FIG. 2.
Figure 4:
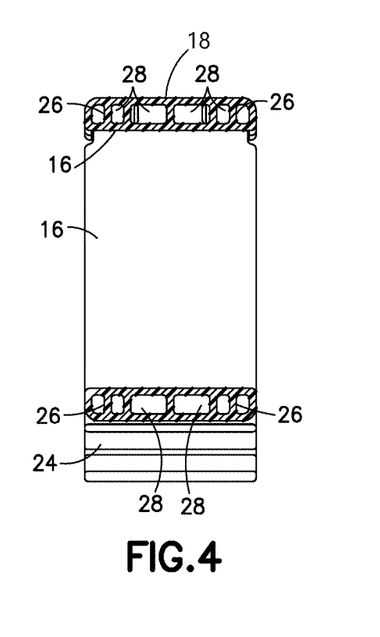
FIG. 4 is a diagram representing a sectional view of the curtain retention bracket depicted in FIG. 1, the section being taken along line 4-4 seen in FIG. 2.
Figure 5:
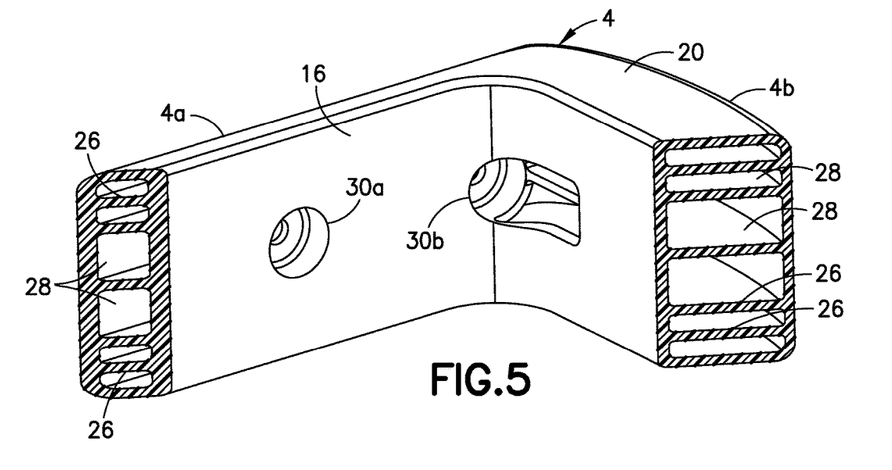
FIG. 5 is a diagram representing an isometric view of a U-shaped chambered body which is part of the curtain retention bracket depicted in FIG. 1.
Figure 6:
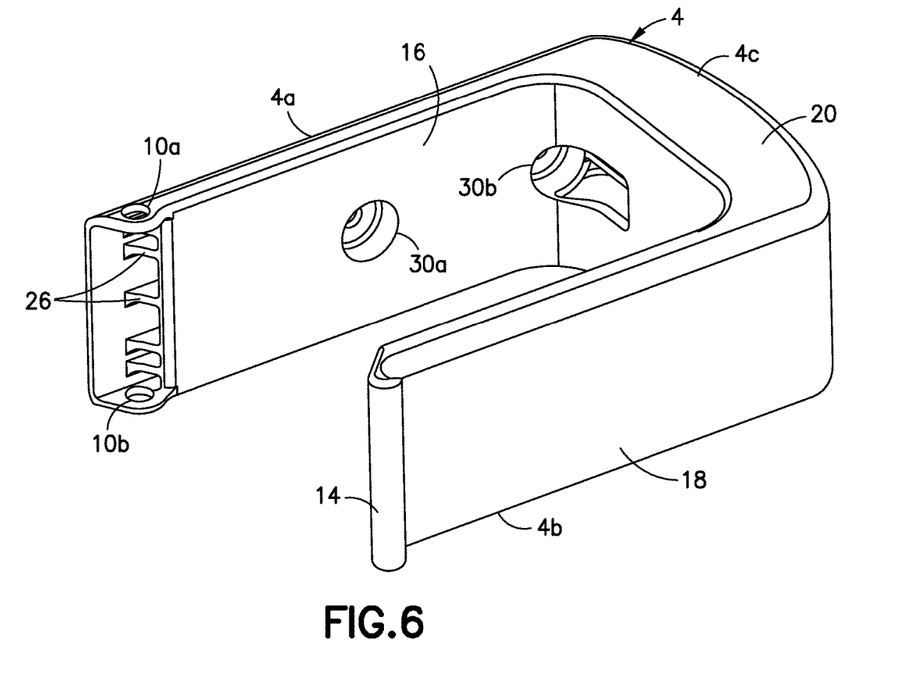
FIG. 6 is a diagram representing an isometric view of a sectioned portion of the U-shaped chambered body depicted in FIG. 5.

FIG. 2 shows a top view of the curtain retention bracket 2 depicted in FIG. 1. FIG. 3 represents a sectional view of the same curtain retention bracket 2, the section being taken along line 3-3 seen in FIG. 2. FIG. 4 represents a sectional view of the same curtain retention bracket 2, the section being taken along line 4-4 seen in FIG. 2. FIG. 5 shows an isometric view of the chambered body 4 (without clasp 6), while FIG. 6 shows an isometric view of a sectioned portion of the chambered body 4 depicted in FIG. 5.

As best seen in the isometric view of FIG. 5, the chambered body 4 further comprises a plurality of ribs 26 which extend through the entire chambered body 4, connect the inner wall 16 to the outer wall 18. Each of the ribs 26 has a U-shaped area. The plurality of ribs 26 are preferably disposed in mutually parallel planes, which planes in turn are parallel to the upper and lower walls 20 and 22. The ribs 26 define a plurality of chambers 28 which extend through the entire chambered body 4, thereby creating a chambered construction that has an extremely high torsional stiffness-to-weight ratio, exceeding that obtained by a conventional ribbed type molding.

As best seen in FIG. 3, the arm 4*a* of chambered body 4 has first and second countersunk holes 30*a* and 30*b* which will align with existing holes in wall 32 (seen in FIGS. 7 and 8) and receive respective fasteners when the curtain retention bracket 2 is mounted to the wall 32. Hole locations and spacing may vary to suit specific applications. The functional design of the wall-mounted curtain retention bracket 2 will now be described with reference to FIGS. 7 and 8.

Figure 7:
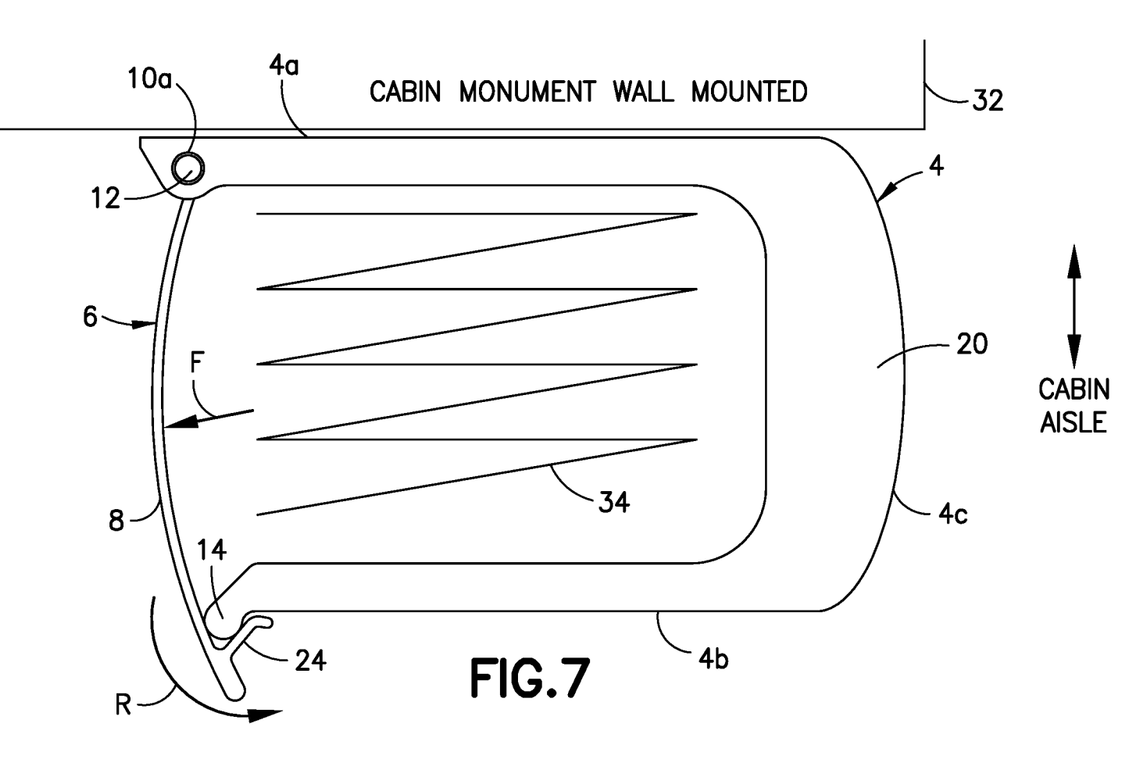
FIG. 7 is a diagram representing a top view of a curtain retention bracket that is mounted to a wall and that is in a closed state with a folded curtain retained therein, which folded curtain is applying a force (indicated by a straight arrow) on a clasp of the curtain retention bracket that is urging the latched clasp to rotate while the latched clasp remains closed.

FIG. 7 shows a top view of a curtain retention bracket 2 (of the type depicted in FIGS. 1-6) that is mounted in a well-known manner to a wall 32 of an aircraft cabin by means of a pair of fasteners not shown. In accordance with one implementation, the wall 32 is a honeycomb composite panel made of fiber-reinforced plastic material. A pair of threaded inserts (not shown in FIG. 7) are potted into the honeycomb composite panel. A pair of bolts are then respectively inserted in the first and second countersunk holes 30*a* and 30*b* and screwed into the threaded inserts. The curtain retention bracket 2 is preferably attached near a corner of the wall 32 at a position such that the curtain retention bracket 2 does not project beyond the corner of the wall 32 and into the cabin aisle (indicated by a double-headed arrow in FIG. 7).

In the closed state depicted in FIG. 7, a folded curtain 34 is stowed in the space bounded by the chambered body 4 and latched clasp 6. During retention, the folded curtain may apply a force F on the clasp 6 in the direction indicated by the straight arrow in FIG. 7. This force F has the effect of urging the latched clasp 6 to rotate away from the base 4*c*, but due to the retraction of the clasp 6 which force F causes, the latched clasp remains locked in the closed position. As used herein, the term "retraction of the clasp" refers to the clasp 6 becoming more bowed, whereas the term "expansion of the clasp" refers to the clasp 6 becoming less bowed. In a more bowed state, the clasp 6 has a radius which is smaller than the radius of the clasp 6 in a less bowed state. The bowing of the clasp 6 in response to force F produces a small rotation R (indicated by the curved arrow in FIG. 7) of the second end of clasp 6 that causes the latch feature 24 to press against the catch feature 14, thereby locking the clasp 6 in place and preventing escape of the curtain 34 from the curtain retention bracket 2. More specifically, the catch feature 14 will exert a force on the latch feature 24 tending to block displacement of the latch feature 24 in the opening direction when force F is exerted on the strap 8 in an outward direction away from the base 4*c* of the chambered body 4.

Figure 8:
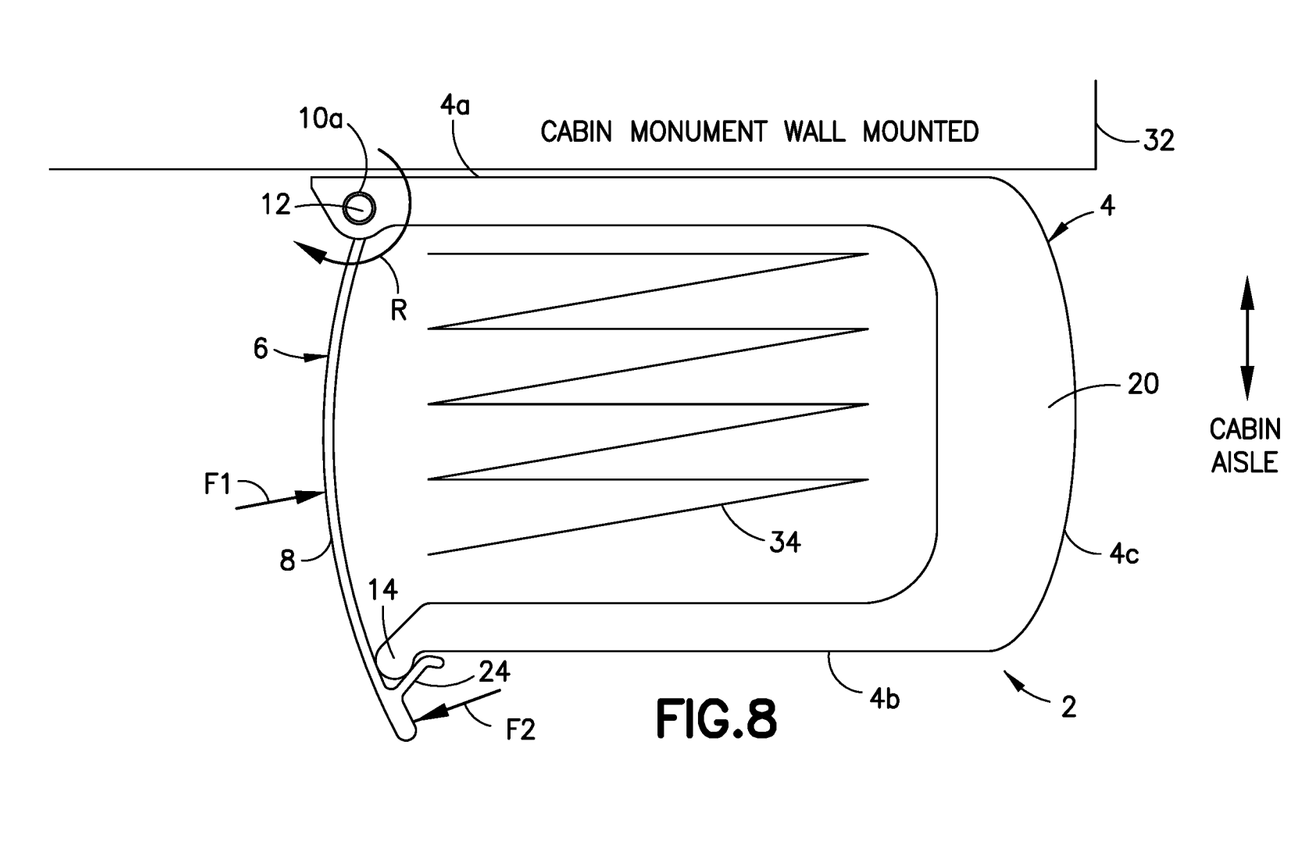
FIG. 8 is a diagram representing a top view of a curtain retention bracket that is mounted to a wall and that is in a closed state with a folded curtain retained therein, but with opening forces (indicated by respective straight arrows) being manually applied which will enable the operator to expand and open the clasp easily to allow the curtain to be unfolded and removed.

FIG. 8 shows a top view of the wall-mounted curtain retention bracket 2 depicted in FIG. 7, but in a situation wherein opening forces F1 and F2 (indicated by respective straight arrows) are being manually applied by an operator. This manipulation will enable the operator to easily expand and open the clasp 6 using only one hand. Upon opening of the clasp 6, the curtain 34 can be removed from the curtain retention bracket 2 and unfolded for deployment. Using one hand, the operator pushes the strap 8 with his/her thumb (thereby applying force F1 which causes the strap 8 to expand, i.e., become less bowed) and pulls the other end of the clasp 6 from which the latch feature is projecting (i.e., the first projection) with a finger in a manner that reduces the curvature of the strap 8, i.e., by applying force F2 which causes the latch feature 24 to pass over the catch feature 12 (i.e., the second projection). The operator then moves his/her hand away from the catch feature 24 while concurrently pushing the strap 8 and pulling the other end of the clasp 6, thereby causing the clasp 6 to rotate about the axis of the hinge pin portion 12, which rotation is indicated by curved arrow R in FIG. 8

In accordance with one example the clasp 6 and chambered body 4 may be produced using additive manufacturing processes. For example, a selective laser sintering process can be used. Selective laser sintering is an additive manufacturing technique that uses a laser as the power source to sinter powdered material (typically metal), aiming the laser automatically at points in space defined by a three-dimensional model and binding the material together to create a solid structure. In accordance with one implementation, the starting powder for selective laser sintering of the chambered body was an aluminum-impregnated nylon 12 powder that is commercially available from Advanced Laser Materials, LLC, Temple Texas, while the starting powder for selective laser sintering of the clasp was a nylon 11 powder.

Figure 9:
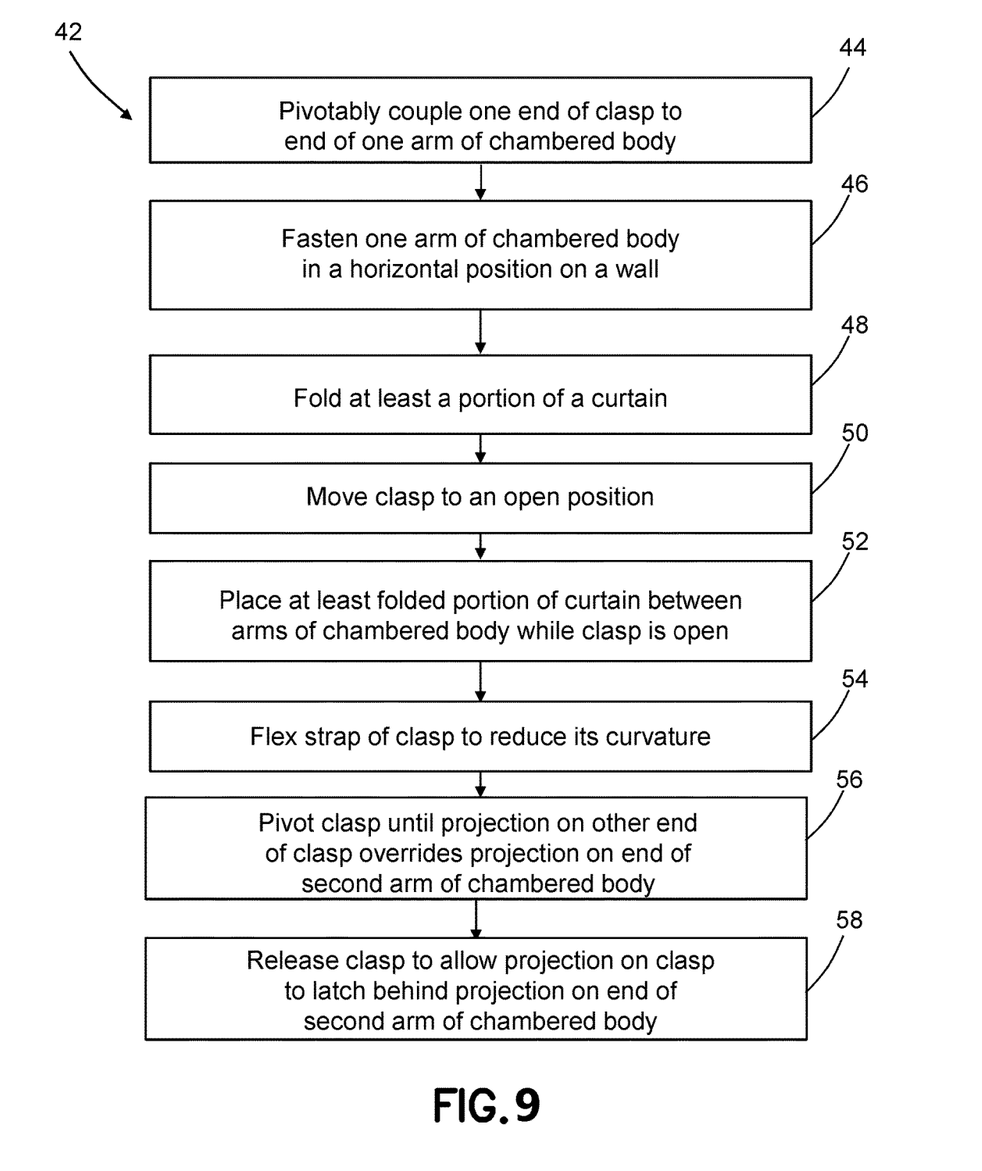
FIG. 9 is a flowchart identifying steps of a method for providing an easily operable bracket capable of retaining a folded curtain in a stowed position.

FIG. 9 is a flowchart identifying steps of a method 42 for providing an easily operable bracket capable of retaining a folded curtain in a stowed position. After the clasp 6 and the chambered body 4 have been produced, one end of the clasp 6 is pivotably coupled to the end of the first arm 4*a* of the chambered body 4 (step 44). Then the first arm 4*a* of the chambered body 4 is fastened to the wall 32 in a horizontal position (step 46). The installed curtain retention bracket 2 is now ready to be used. First, at least a portion of the curtain 34 is folded (step 48). Then the clasp 6 is moved to an open position (step 50). At least the folded portion of the curtain 34 is then placed between the first and second arms 4*a* and 4*b* of the chambered body 4 while the clasp 6 is in the open position (step 52). Then the strap 8 is flexed to reduce its curvature (step 54) and the clasp is pivoted until the first projection (i.e., latch feature 24) on the clasp 6 passes over the second projection (i.e., catch feature 12) on the chambered body 4 (step 56). The clasp 6 is then released to allow the first projection to latch behind the second projection (step 58), thereby locking the clasp 6 in a closed position. In accordance with one embodiment, step 54 is performed by the operator using one hand by pushing the strap 8 with a thumb of his/her hand and pulling the other end of the clasp 6 with a finger of the hand in a manner that reduces the curvature of the strap 8; and step 56 is performed by the operator moving his/her hand toward the second projection while concurrently pushing the strap 8 and pulling the other end of the clasp 6.

While apparatus and methods for retaining a foldable curtain in a stowed position have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A curtain retention bracket comprising:
   a chambered body comprising a base and first and second arms integrally formed with the base, the first arm having a first end and the second arm having a second end; and
   a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state,
   wherein the second end of the clasp comprises a first projection, the second end of the second arm of the chambered body comprises a second projection, and the clasp in a latched state is configured so that the second projection is able to override and latch behind the first projection when the strap is in a stressed state and is not able to unlatch from behind the first projection when the clasp is in the latched state and the strap is in the unstressed state;
   the chambered body includes an upper wall, a lower wall, an inner wall integrally formed with the upper and lower walls, an outer wall integrally formed with the upper and lower walls, and a plurality of ribs integrally formed with the inner and outer walls;
   the first end of the first arm includes a portion of the upper wall, a portion of the lower wall and a portion of the outer wall integrally formed with the portions of the upper and lower walls, the portion of the upper wall having a first opening and the portion of the lower wall having a second opening, the first and second openings being coaxial and having a same radius; and
   the first end of the clasp comprises a hinge pin portion having a first end seated in the first opening and a second end seated in the second opening.

2. The curtain retention bracket as recited in claim 1, wherein the clasp and the chambered body are configured such that the first projection can be latched on the second projection when the strap has a second curvature less than the first curvature.

3. The curtain retention bracket as recited in claim 1, wherein the clasp and the chambered body are configured such that in the latched state, the second projection will exert a first force on the first projection tending to block displacement of the first projection when a second force is exerted on the strap in an outward direction away from the base of the chambered body.

4. The curtain retention bracket as recited in claim 1, wherein the first projection is integrally formed with the strap and the second projection is integrally formed with the second end of the second arm of the chambered body.

5. A curtain retention bracket comprising:
   a chambered body comprising a base and first and second arms integrally formed with the base, the first arm having a first end and the second arm having a second end; and
   a clasp comprising a first end pivotably coupled to the first end of the first arm of the chambered body, a second end which is releasably engageable with the second end of the second arm of the chambered body, and a strap connecting the first end of the clasp to the second end of the clasp,
   wherein the strap is flexible and has a bow shape in an unstressed state;
   the first end of the first arm of the chambered body has first and second openings;
   the first end of the clasp comprises a hinge pin portion having a first end seated in the first opening and a second end seated in the second opening;
   the second end of the second arm of the chambered body comprises a catch feature;
   the second end of the clasp comprises a latch feature that is latched on the catch feature in a latched state;
   the strap in the unstressed state has a first curvature;
   in the unstressed state an axis of the hinge pin portion and a point where the strap connects to the latch feature are separated by a first distance;
   in the latched state the axis of the hinge pin portion and the point where the strap connects to the latch feature is separated by a second distance which is either equal to or greater than the first distance; and
   the clasp is pivotable from the latched state to an unlatched state when the axis of the hinge pin portion and the point where the strap connects to the latch feature are separated by a third distance greater than the second distance by an amount sufficient to enable the latch feature to override the catch feature.

6. An assembly comprising a curtain that is foldable, a wall, and a curtain retention bracket mounted to the wall and configured to retain the curtain in a folded state when the curtain retention bracket is in a closed state, wherein the curtain retention bracket comprises:
   a stiff chambered body comprising a base and first and second arms integrally formed with the base, the first arm having a first end and the second arm having a second end; and a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state, wherein the second end of the clasp comprises a first projection, the second end of the second arm of the chambered body comprises a second projection, and the clasp in a latched state is configured so that the second projection is able to override and latch behind the first projection when the strap is in a stressed state and is not able to unlatch from behind the first projection when the clasp is in the latched state and the strap is in the unstressed state;

the chambered body includes an upper wall, a lower wall, an inner wall integrally formed with the upper and lower walls, an outer wall integrally formed with the upper and lower walls, and a plurality of ribs integrally formed with the inner and outer walls;

the first end of the first arm includes a portion of the upper wall, a portion of the lower wall and a portion of the outer wall integrally formed with the portions of the upper and lower walls, the portion of the upper wall having a first opening and the portion of the lower wall having a second opening, the first and second openings being coaxial and having a same radius; and the first end of the clasp comprises a hinge pin portion having a first end seated in the first opening and a second end seated in the second opening.

7. The assembly as recited in claim in claim 6, wherein the curtain in the folded state is disposed between the first and second arms and between the base and the clasp.

8. The assembly as recited in claim 7, wherein the clasp and the chambered body are configured such that the first projection can be latched on the second projection when the strap has a second curvature less than the first curvature.

9. The assembly as recited in claim 8, wherein the clasp and the chambered body are configured such that in the latched state, the second projection exerts a first force on the first projection tending to block displacement of the first projection when a second force is exerted on the strap in an outward direction away from the base of the chambered body.

10. The assembly as recited in claim in claim 6, wherein the first arm is fastened parallel to the wall.

11. The assembly as recited in claim 6, wherein the first projection is integrally formed with the strap and the second projection is integrally formed with the second end of the second arm of the chambered body.

12. An assembly comprising a curtain that is foldable, a wall, and a curtain retention bracket mounted to the wall and configured to retain the curtain in a folded state when the curtain retention bracket is in a closed state, wherein the curtain retention bracket comprises:

a stiff chambered body comprising a base and first and second arms integrally formed with the base, the first arm having a first end and the second arm having a second end; and a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state, and wherein:

the first end of the first arm of the chambered body has first and second openings, and the first end of the clasp comprises a hinge pin portion having a first end seated in the first opening and a second end seated in the second opening;

the second end of the second arm of the chambered body comprises a catch feature, the second end of the clasp comprises a latch feature that is latched on the catch feature in a latched state, and the strap in the unstressed state has a first curvature;

the clasp and the chambered body are configured such that the latch feature can be latched on the catch feature when the strap has a second curvature less than the first curvature;

in the unstressed state an axis of the hinge pin portion and a point where the strap connects to the latch feature are separated by a first distance;

in the latched state the axis of the hinge pin portion and the point where the strap connects to the latch feature is separated by a second distance which is either equal to or greater than the first distance; and the clasp is pivotable from the latched state to an unlatched state when the axis of the hinge pin portion and the point where the strap connects to the latch feature are separated by a third distance greater than the second distance by an amount sufficient to enable the latch feature to override the catch feature.

13. A curtain retention bracket comprising:

a chambered body comprising a base and first and second arms integrally formed with the base, the first arm having a first end and the second arm having a second end; and a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state, wherein the second end of the clasp comprises a first projection, the second end of the second arm of the chambered body comprises a second projection, and the clasp in a latched state is configured so that the second projection is able to override and latch behind the first projection when the strap is in a stressed state and is not able to unlatch from behind the first projection when the clasp is in the latched state and the strap is in the unstressed state;

the first end of the first arm of the chambered body has first and second openings, and the first end of the clasp comprises a hinge pin portion having a first end seated in the first opening and a second end seated in the second opening;

in the unstressed state an axis of the hinge pin portion and a point where the strap connects to the first projection are separated by a first distance;

in the latched state the axis of the hinge pin portion and the point where the strap connects to the first projection is separated by a second distance which is either equal to or greater than the first distance; and the clasp is pivotable from the latched state to an unlatched state when the axis of the hinge pin portion and the point where the strap connects to the first projection are separated by a third distance greater than the second distance by an amount sufficient to enable the first projection to override the second projection.

14. The curtain retention bracket as recited in claim 13, wherein the chambered body comprises inner and outer walls having profiles, which inner and outer walls are connected externally by upper and lower walls having areas and internally by a plurality of ribs having areas.

15. An assembly comprising a curtain that is foldable, a wall, and a curtain retention bracket mounted to the wall and configured to retain the curtain in a folded state when the curtain retention bracket is in a closed state, wherein the curtain retention bracket comprises:

a stiff chambered body comprising a base and first and second arms integrally formed with the base, the first arm having a first end and the second arm having a second end; and     a clasp comprising a first end pivotably coupled to the first end of the first arm of the chambered body, a second end which is releasably engageable with the second end of the second arm of the chambered body, and a strap connecting the first end of the clasp to the second end of the clasp, wherein the strap is flexible and has a bow shape in an unstressed state,   wherein the second end of the clasp comprises a first projection, the second end of the second arm of the chambered body comprises a second projection, and the clasp in a latched state is configured so that the second projection is able to override and latch behind the first projection when the strap is in a stressed state and is not able to unlatch from behind the first projection when the clasp is in the latched state and the strap is in the unstressed state;

the first end of the first arm of the chambered body has first and second openings, and the first end of the clasp comprises a hinge pin portion having a first end seated in the first opening and a second end seated in the second opening;

in the unstressed state an axis of the hinge pin portion and a point where the strap connects to the first projection are separated by a first distance;

in the latched state the axis of the hinge pin portion and the point where the strap connects to the first projection is separated by a second distance which is either equal to or greater than the first distance; and   the clasp is pivotable from the latched state to an unlatched state when the axis of the hinge pin portion and the point where the strap connects to the first projection are separated by a third distance greater than the second distance by an amount sufficient to enable the first projection to override the second projection.

16. The assembly as recited in claim in claim 15, wherein the chambered body comprises inner and outer walls having profiles, which inner and outer walls are connected externally by upper and lower walls having areas and internally by a plurality of ribs having areas.

\* \* \* \* \*